United States Patent [19]

Reasoner

[11] Patent Number: 5,568,592
[45] Date of Patent: Oct. 22, 1996

[54] SYSTEM AND METHOD FOR CONSERVING POWER IN AN OPTICAL AUTOCHANGER

[75] Inventor: Kelly J. Reasoner, Ft. Collins, Colo.

[73] Assignee: Hewlett-Pacard Company, Palo Alto, Calif.

[21] Appl. No.: 322,821

[22] Filed: Oct. 13, 1994

[51] Int. Cl.6 .............................. G05B 15/00; G05B 19/00
[52] U.S. Cl. .......................... 395/80; 395/750; 318/672; 318/673; 364/184
[58] Field of Search ................... 395/80, 750; 318/672, 318/673; 364/184

[56] References Cited

U.S. PATENT DOCUMENTS

| 4,794,586 | 12/1988 | Korth | 369/215 |
|---|---|---|---|
| 5,231,549 | 7/1993 | Morehouse et al. | 360/75 |
| 5,354,413 | 10/1994 | Smesny et al. | 156/627 |
| 5,412,809 | 5/1995 | Tam et al. | 395/750 |
| 5,471,561 | 11/1995 | Cougill et al. | 395/82 |
| 5,473,550 | 12/1995 | Cameron et al. | 364/571.01 |

Primary Examiner—Robert W. Downs
Assistant Examiner—A. Katbab

[57] ABSTRACT

A system is disclosed for conserving power in a robotic arm device. The robotic arm device is responsive to a motion command and controlled by a servo loop having a motor, a motor driver, and a motor encoder. The system positions the robotic arm to a stow position when the time since a last motion command exceeds a predetermined power shut down time. When the robotic arm has reached the stow position, power is removed from the motor and the motor drivers by opening the servo loop. Thus, power is conserved while the robotic arm rests in its stow position. When a new command is received, the servo loop is closed and power is applied to position the robotic arm to its desired position.

15 Claims, 4 Drawing Sheets

SYSTEM AND METHOD FOR CONSERVING POWER IN AN OPTICAL AUTOCHANGER

BACKGROUND OF THE INVENTION

1. Field of the Invention

The present invention relates generally to an apparatus and method for conserving power in a computer controlled system. The present invention relates more specifically to conserving power in an apparatus containing a positioning mechanism.

2. Related Art

In servo motor control systems, a motor is controlled by applying a voltage reference signal representing a desired motor position to a motor driver which provides current to the motor. The motor responds to the current by turning a motor shaft. A motor encoder attached to the motor shaft senses the position of the motor shaft as it turns. A motor encoder signal representing the actual motor position is fed back and compared to the desired motor position. The difference between the desired motor position and the motor encoder position is used to compute the voltage reference signal which is then applied to the motor drivers. In theory, this process continues until the difference between the desired motor position and the motor encoder position is zero, or in other words, until the desired motor position and the actual motor position are the same.

A problem with this process in actual practice is that once the motor reaches the desired motor position, some voltage level must be continually applied to the motor drivers to overcome external forces such as gravity to maintain the position of the motor. Significant heat builds up within the motor and the motor drivers when the servo motor control loop is required to maintain the position of the motor for a long period of time. This build-up of heat results in decreased reliability of the motor electronics especially in applications where the motor is used to position a substantial mass such as a robotic arm of an optical autochanger.

SUMMARY OF THE INVENTION

The present invention is directed to a power conservation module developed for the unique problems encountered by positioning mechanisms. According to the invention, steps are taken prior to removing power from the motor and the motor drivers to ensure the proper operation of the positioning mechanism. Specifically, the invention accomplishes this by moving the positioning mechanism to a specified location prior to removing power from the motor and the motor drivers.

The invention provides an apparatus and method whereby a power conservation module interrupts the normal operation of the servo motor control loop when the positioning mechanism has remained in the same position for a predetermined period of time. After a predetermined time has passed, the power conservation module commands the positioning mechanism to a stow position. Once the positioning mechanism reaches the stow position, the power conservation module safely removes power from the motor and the motor drivers.

The power conservation module interrupts the servo motor control loop controlling the motor of the robotic arm device if no motion commands have been received for a pre-determined length of time. The power conservation module then commands the robotic arm to a stow position, for example, at the bottom end of a lead screw. Once the robotic arm reaches the stow position, the power conservation module opens the servo motor control loop, removing voltage from the motor drivers which in turn removes the current being fed to the motor. This enters the servo motor control into a power conservation mode.

The power conservation module reduces the amount of power consumed by the motor and the motor drivers when the robotic arm is inactive, i.e. overnight, during weekends, and other periods of prolonged inactivity. In addition, the power conservation module reduces the amount of heat build-up in the motor electronics, thereby improving the overall reliability of the electronic components. The power conservation module accomplishes this while maintaining position information so that on receiving a new motion command, the robotic arm may be moved to the desired position quickly without lengthy recalibration.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

The build-up of excess heat in motors and motor drivers can lead to decreased reliability and degraded performance. One method of reducing the build-up of heat in the motor and the motor drivers is to shut down the power to these components when the positioning mechanism remains inactive for a prolonged period of time. Due to the nature of positioning mechanisms, however, power to these components cannot just be turned off without possibly harming the user, the operating environment, or the positioning mechanism itself. Proper precautions must be taken prior to removing power to the motor and the motor drivers.

The invention implements a controlled power down using a power conservation module. The power conservation module moves the positioning mechanism to a stow position prior to removing power from the motor and the motor drivers. The stow position is, for example, a hook, a ledge, a platform, or other location where the positioning mechanism can be stored without applying power to the motors to overcome gravity.

Additionally, the position of the positioning mechanism can be continually monitored while the positioning mechanism is in the stow position. This allows the positioning mechanism to be moved immediately upon receiving a new motion command without the need to perform a lengthy recalibration.

Positioning mechanisms exist in many environments. One example environment is a robotic arm designed to spray paint automobiles on an assembly line. Another example environment is a video imaging system which examines the quality of spot welds on products of an assembly line. In both applications, the positioning mechanism may be idle for long periods of time, i.e. during factory shut downs, or assembly line delays, and could take advantage of the power conservation module.

Figure 1:
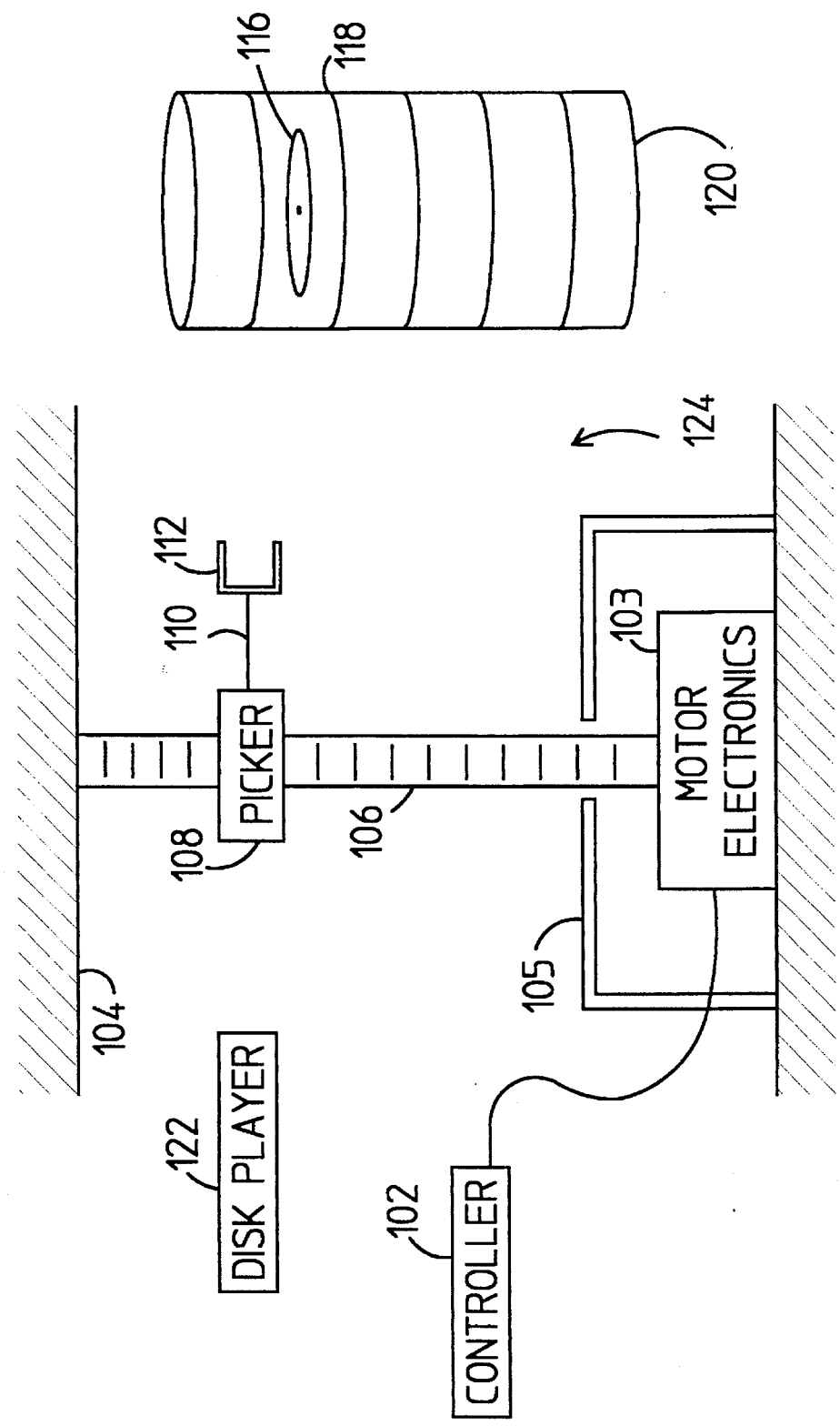
FIG. 1 illustrates a sample environment of the present invention.

A third example environment is a robotic arm designed to retrieve storage media (e.g. optical or magnetic disks or tapes) from a carousel for mounting in a drive. The invention is described in terms of a specific implementation of this third example environment. FIG. 1 illustrates an optical autochanger 100 as an example operating environment for the power conservation module. After reading the following description, it will become apparent to a person skilled in the relevant an how to implement the power conservation module in other applications and/or environments.

Optical autochanger 100 includes a controller 102, a picker assembly 124, an optical disk carousel 120, and an optical disk player 122. Picker assembly 124 includes motor assembly 103, a picker drive 106, a picker 108, a picker arm 110, and a picker gripper 112. Optical disk carousel 120 includes a plurality of optical disk chambers 118 for storing optical disks 116. Optical disk carousel 120 can be, for example, a rotary carousel, a fixed magazine, or other similar storage library.

During normal operation, optical autochanger 100 is commanded to load a specific optical disk 116 into optical disk player 122. In this scenario, controller 102 receives a motion command instructing it to position picker 108 along disk carousel 120 in order to remove the requested optical disk 116 from its disk chamber 118. Upon completing this task, controller 102 receives another motion command instructing it to position picker 108 to load optical disk 116 into disk player 122. More specifically, controller 102, upon receiving a motion command, outputs a voltage to motor assembly 103. Motor assembly 103 turns lead screw 106 which positions picker 108 vertically in position along optical disk carousel 120. Once in the proper vertical position, picker arm 110 is extended, allowing picker gripper 112 to grasp optical disk 116 from optical disk chamber 118. Picker arm 110 is then retracted, and picker 108 is ready to repeat a similar operation to load optical disk 116 into disk player 122.

Figure 2:
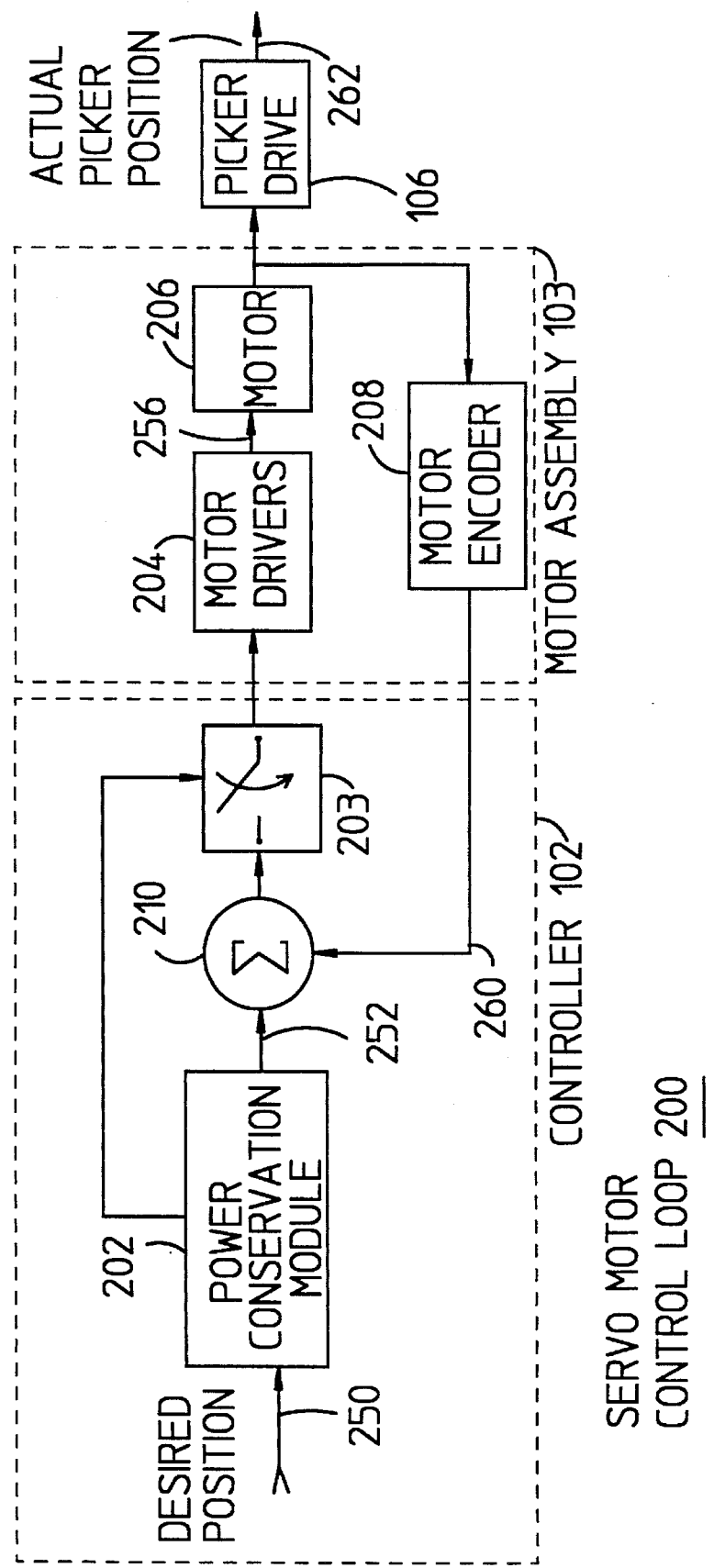
FIG. 2 is a block diagram illustrating the present invention used in a typical servo motor control loop.

FIG. 2 is a block diagram illustrating an example of a servo motor control loop 200 used to control the positioning of the picker 108 in the environment of optical autochanger 100. In this example, servo motor control loop 200 includes a controller 102, motor assembly 103, and a picker drive 106. Controller 102 includes a power conservation module 202, a summing node 210, and a servo loop switch 203. Motor assembly 103 includes motor drivers 204, a motor 206, and a motor encoder 208. Controller 102 is described herein in terms of a specific hardware implementation. After reading this description, it will become apparent to a person skilled in the art how controller 102 can be implemented using software and how other hardware or hardware/software combinations can be made.

When controller 102 receives a motion command, it generates a desired position signal 250. Power conservation module 202 receives desired position signal 250 and passes it to summing node 210. Summing node 210 compares desired position signal 250 with an actual position signal 260 generated from motor encoder 208 and generates an error signal 252 to be applied to motor drivers 204. Under normal operation, error signal 252 passes through servo loop switch 203 to the motor drivers 204. Motor drivers 204 convert error signal 252 to drive current 256 which turns motor 206, thereby engaging picker drive 106 to position picker 108. The position of motor 206 is measured via motor encoder 208. Motor encoder 208 generates actual picker position signal 260 which is fed back to summing node 210 and used to compute error signal 252. This process occurs continuously while servo loop switch 203 is closed.

As stated above, it is desirable to shut down power to the motor and the motor drivers after prolonged periods of inactivity to prevent heat build-up from degrading system performance and also to conserve energy. This is accomplished using a power conservation module 202. After not receiving motion command for a predetermined period, power conservation module 202 interrupts normal servo loop processing. First, power conservation module commands picker 108 to stow position 105 which in the example environment is at the bottom end of lead screw 106. After picker 108 reaches stow position 105, power conservation module 202 opens servo loop 200 by opening servo loop switch 203 which serves to remove power from motor drivers 204. Servo loop switch 200 may be implemented in various ways. For example, controller 102 may actually open a switch or it may disable a digital-to-analog converter used to output a voltage to motor drivers 204.

Servo motor control loop 200 remains open until a new motion command is received by power conservation module 202. When a new motion command is received, power conservation module 202 closes servo loop 200 via servo loop switch 203 and passes desired position 250 to summing node 210.

Figure 3:
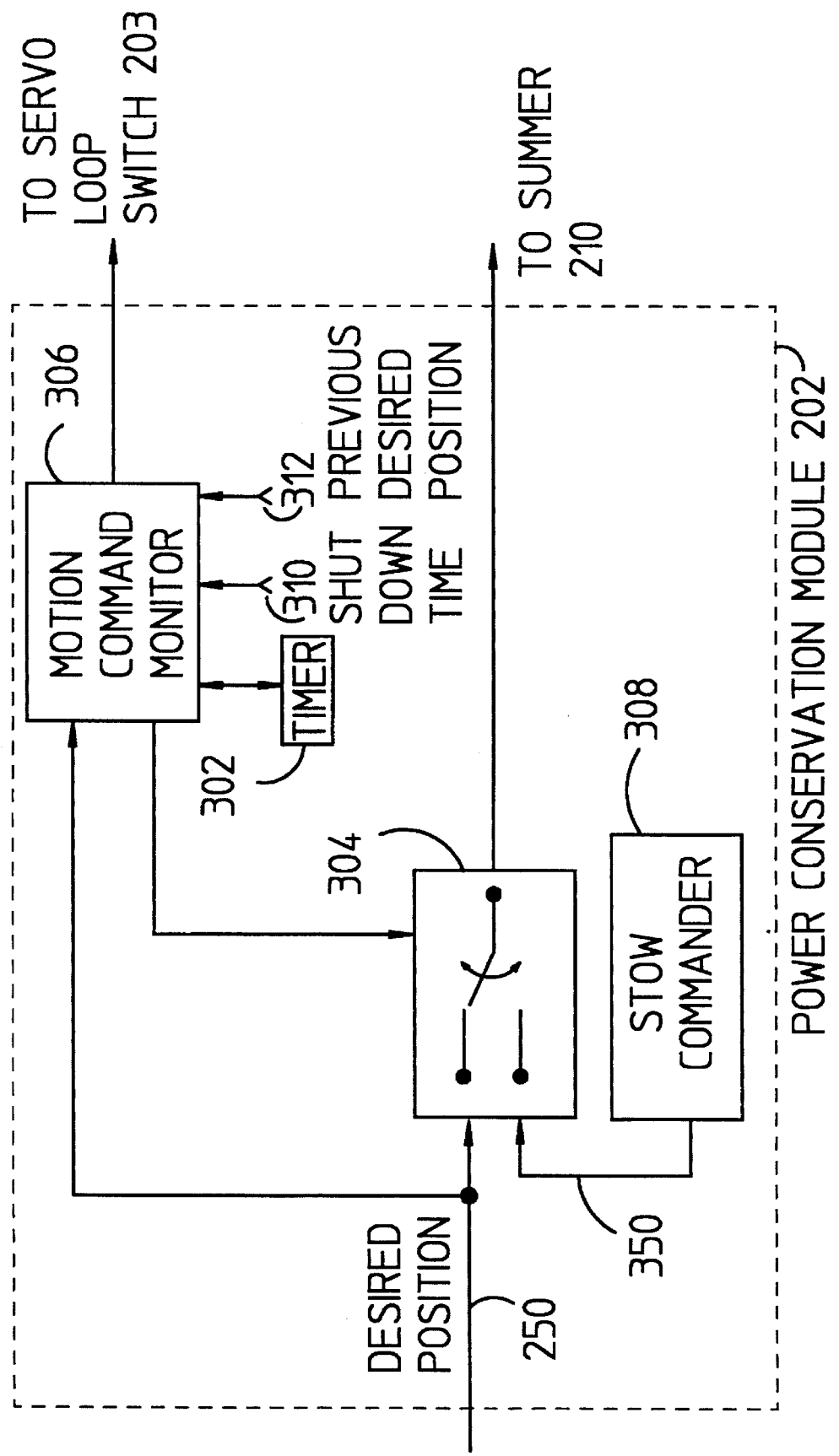
FIG. 3 is a block diagram containing an example implementation of the present invention.

An example implementation of power conservation module 202 is illustrated in FIG. 3. In this example, power conservation module 202 includes a timer 302, a switch 304, a motion command monitor 306, a stow commander 308, a shut down time 310, and a previous desired position 312. Motion command monitor 306 receives desired position 250 with previous desired position 312. If the two are not the same, motion command monitor resets timer 302. If the two are the same, motion command monitor reads timer 302 and compares it with shutdown time 310. If the value of timer 302 exceeds shutdown time 310, motion command monitor 306 changes switch 304 from passing desired position 250 to passing stow command position 350. Stow commander 308, issues a desired position commands to place picker 108 in stow position 105. After picker 108 has reached stow position 105, motion command monitor 306 opens servo loop 200 via servo loop switch 203.

Motion command monitor 306 continues to monitor desired position 250. When motion command monitor receives a desired position 250 that is not the same as previous desired position 312, motion command monitor 306 closes servo loop 200 via servo loop switch 203, changes switch 304 from passing stow command position 350 to passing desired position 250, and resets timer 302. This returns servo motor control loop to normal operation.

Figure 4:
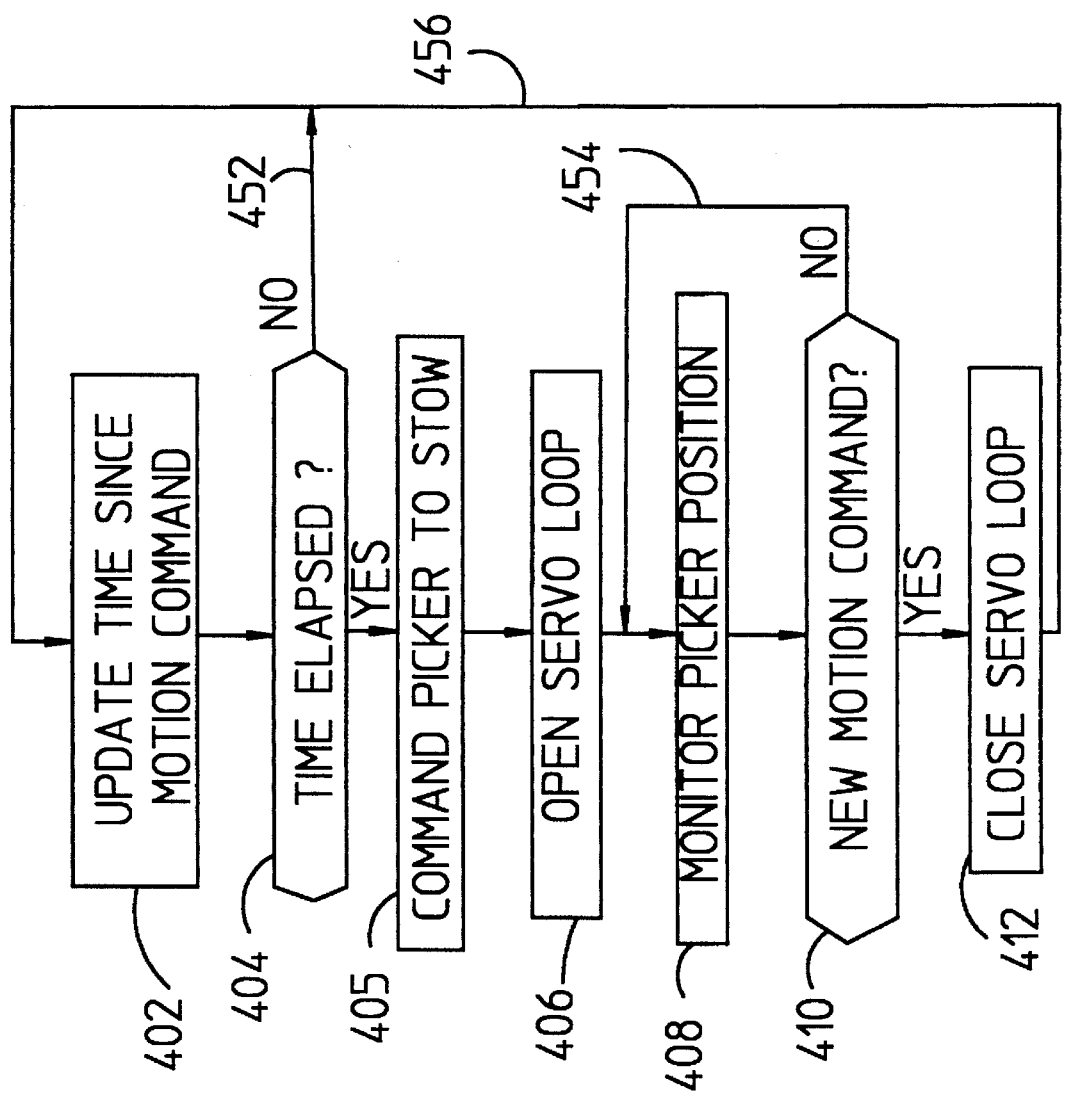
FIG. 4 is a flow chart illustrating the steps of the method of this invention.

FIG. 4 is a block diagram illustrating the operational flow of power conservation module 202. Referring to FIGS. 3 and 4, in a step 402, motion command monitor 306 uses timer 302 to update the time elapsed since a last motion command was received. If a motion command has been received within a specified time-out period (illustrated by a decision step 404), timer 302 is reset and continues counting as illustrated by flowline 452. If, however, the time-out period expires before a next motion command in received, the operation continues at a step 405.

In step 405, stow commander 308 issues a motion command to position picker 108 in stow position 102. When picker 108 has reached stow position 105, the operation continues at a step 406, where power conservation module 202 opens servo loop 200 via servo loop switch 203 thereby prohibiting error signal 252 from activating motor drivers 204. As long as the servo loop 200 remains open, no power is applied to the motor or the motor drivers and the picker 108 remains in the stow position 105.

In a step 408, motor encoder 208, unaffected by the servo loop being open, continues to monitor the position of motor 206. In a step 410, motion command monitor 306 determines if a new motion command has been received. If a motion command has been received, flow proceeds to a step 412; otherwise, flow returns to step 408, via flowline 454, and picker 108 remains in stow position 105. In a step 412, power conservation module closes servo loop 200 via servo loop switch 203, and the system returns to normal operation by reacting to the new motion command. Flow returns to step 402 via flowline 456 to monitor elapsed time since a new motion command.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for conserving power in a robotic arm device responsive to a motion command and controlled by a servo loop having a motor, a motor driver, and a motor encoder, comprising:

(a) timer means for monitoring an idle time since a last motion command;

(b) means for determining whether said idle time exceeds a predetermined time;

(c) means for positioning the robotic arm to a stow position when said idle time exceeds said predetermined time; and (d) means for opening the servo loop to disable the motor after the robotic arm has reached said stow position to conserve power while the robotic arm is in said stow position.

2. The power conserving system of claim 1, further comprising means for monitoring position of the motor while the servo loop is open.

3. The power conserving system of claim 1, further comprising:

(a) means for receiving a new motion command while the servo loop is open; and (b) means for resetting said timer means in response to said received new motion command.

4. The power conserving system of claim 3, further comprising means for closing the servo loop when said new motion command is received.

5. A method for conserving power in a robotic arm device responsive to a motion command and controlled by a servo loop having a motor, a motor driver, and a motor encoder, comprising the steps of:

(a) monitoring an idle time since a last motion command;

(b) positioning the robotic arm to a stow position when said idle time exceeds a predetermined power shut down time; and (c) opening the servo loop to disable the motor and the motor driver after the robotic arm has reached said stow position thus conserving power while the robotic arm is in said stow position.

6. The power conserving method of claim 5, further comprising a step of monitoring the position of the motor while the servo loop is open.

7. The power conserving method of claim 5, further comprising the steps of:

(d) receiving a new motion command while the servo loop is open; and (e) resetting the timer when receiving said new motion command.

8. The power conserving method of claim 7, further comprising a step of closing the servo loop when said new motion command is received.

9. An autochanger for handling storage media comprising:

a carousel for storing a plurality of storage media;

a robotic arm device for retrieving the storage media from said carousel, wherein mid robotic arm is responsive to a motion command and controlled by a servo loop having a motor, a motor driver, and a motor encoder; and a power conservation module for opening the servo loop to disable said motor if a motion command is not received in a predetermined mount of time thereby conserving power.

10. The autochanger of claim 9, wherein said power conservation module comprises:

(a) timer means for monitoring an idle time since a last motion command;

(b) means for determining whether said idle time exceeds a predetermined time;

(c) means for positioning the robotic arm to a stow position when said idle time exceeds said predetermined time; and (d) means for opening the servo loop to disable the motor after the robotic arm has reached said stow position thus conserving power while the robotic arm is in said stow position.

11. The autochanger of claim 10, wherein said power conservation module further comprises means for monitoring position of the motor while the servo loop is open.

12. The autochanger of claim 11, wherein said power conservation module further comprises:

(a) means for receiving a new motion command while the servo loop is open; and (b) means for resetting said timer means in response to said new motion command.

13. The autochanger of claim 12, wherein said power conservation module further comprises means for closing the servo loop when said new motion command is received.

14. The autochanger of claim 9, wherein said carousel is an optical disk carousel comprising a plurality of optical disk chambers for storing optical disks.

15. The autochanger of claim 14, further comprising at least one optical disk player for playing said optical disks.

* * * * *